Figure 1:
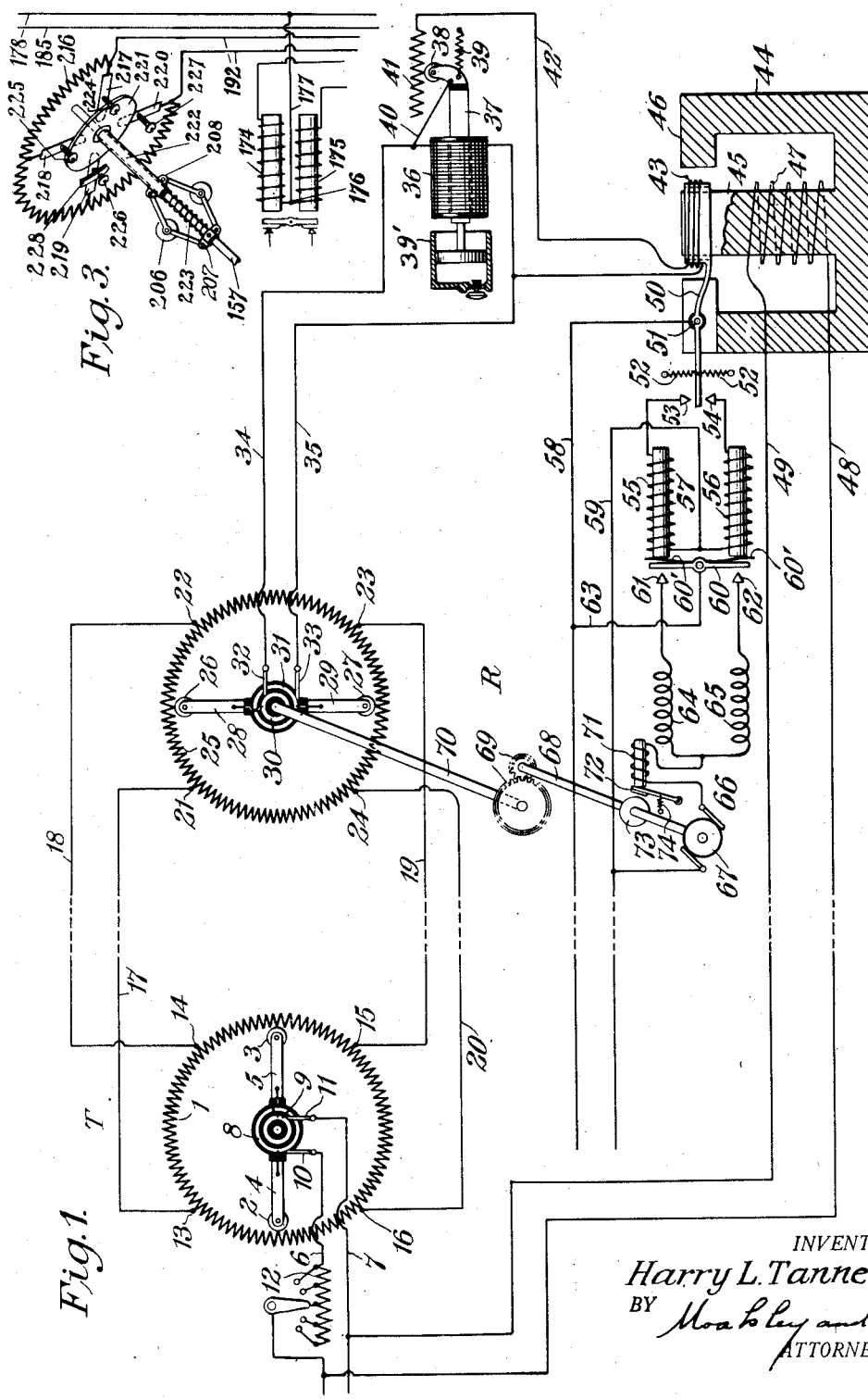

July 1, 1930.  H. L. TANNER  1,768,966
TRANSMISSION SYSTEM
Filed Aug. 4, 1924   2 Sheets-Sheet 1

INVENTOR.
Harry L. Tanner
BY
ATTORNEYS.

July 1, 1930. H. L. TANNER 1,768,966
TRANSMISSION SYSTEM
Filed Aug. 4, 1924 2 Sheets-Sheet 2

INVENTOR.
Harry L. Tanner
BY
ATTORNEYS.

Patented July 1, 1930

1,768,966

UNITED STATES PATENT OFFICE

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK

TRANSMISSION SYSTEM

Application filed August 4, 1924. Serial No. 730,041.

This invention relates to self-synchronizing transmission systems, particularly adapted for transmitting signals from a sending station to one or more receiving stations.

Many types of signal transmission systems of the so-called step-by-step type have been proposed and some of them have been extensively used, but these systems, if they possess the advantage of being self-synchronizing, are limited in the number of positions which may be obtained by each transmitting and receiving unit. In order to obtain the number of positions usually required it is therefore necessary to provide a number of units for transmitting positions with successive degrees of fineness, and to arrange for the consecutive actuation of the units to enable the desired position to be ultimately set up.

In an attempt to overcome the disadvantages of step-by-step systems, particularly with respect to the number of positions obtainable, systems have been devised using closed circuit resistance units as transmitters, which are connected by taps to movable coils of receiver motors of the alternating current type. By means of rotary brushes co-acting with the resistance units variations in potential may be obtained at the motor coils to cause them to assume different positions in the manner of rotors of alternating current motors, thus reproducing the positions of the transmitter brushes. Systems of this character are not adapted for use in cases where the receivers are subject to any considerable load or even a varying load, as they usually must be in signaling systems, for the load causes a drag on the receivers with consequent errors in transmitted indications.

Other systems have been proposed based upon the principle of the wheatstone bridge in which an unbalancing of the bridge by altering the resistance of one of the arms located at the transmitter causes a corresponding movement of an indicator motor for controlling the resistance of an arm of the bridge at the receiving station until the balanced condition of the bridge is restored. Systems of this character are limited to the range of the resistance of the variable arms of the bridge and are therefore not adapted for use in transmitting indications between widely separated limits with any degree of fineness. They are also open to another objection on account of varying resistance at the points of contact of the brushes, which by affecting the balanced condition of the bridge impairs the accuracy of the transmitted indications.

As distinguished from the systems described above which are particularly intended for operation by direct current, other systems, such as shown in patent to Michalke No. 684,579 October 15, 1901, based upon the use of alternating current have been produced for the purpose of reproducing at distant points the movement of a transmitter as the latter is continuously rotated. Systems of this character require alternating current for their operation and such current is not always conveniently available. The elements of the system require to be accurately designed and constructed in order that the system may function with the required degree of accuracy, but even then they are not capable of carrying any load and auxiliary mechanism must be provided for this purpose and more skill is ordinarily required in maintaining and repairing the system than is required in the case of systems adapted to be operated by simple direct current.

The present invention has for its general object the production of a self-synchronizing transmission system adapted to be operated by direct current, although not necessarily limited thereto, in which the movements of one or more members at a transmitting station may be accurately reproduced under all conditions at receiving stations unaffected by contact resistance, variations in voltage or other factors which affect the accuracy of prior systems. Another principal object of the invention is the production of a transmission system of simple construction, the elements of which may be easily manufactured and assembled and which at the same time possesses the accuracy and reliability required in signal transmission systems, particularly if used under conditions where failure might entail serious consequences, as for instance when used in connection with systems for controlling the firing of ordnance either on land or at sea.

The above objects, as well as others which will hereinafter appear are attained by providing transmitters and receivers in the form of closed resistance units having a number of points of one connected to corresponding points of the other and to which current is supplied, at the transmitting units, by movable contact devices co-acting with the resistance to produce variations in potential at the points of connection to the receiver units. The latter units are of similar construction, but their contact devices are power driven, as by means of a servo motor, the actuation of which is controlled by a system of relays. The energization of these relays depends upon the existence of a potential difference between the contact devices of the corresponding receiver unit. When such a potential difference exists the motor will be energized to move the contact devices until they ultimately reach a position where there is no potential difference between them, at which position they will come to rest. This position always bears a predetermined relation to the position of the contact devices of the corresponding transmitter, so that the contact devices of the receiver accurately reproduce the movement of the contact devices of the transmitter and this movement may be imparted to indicators or other desired instruments by the power of the motor that drives the contact devices of the receiver units.

The system is preferably provided with means for damping any oscillations of the motor and contact devices of the receiver units in order to prevent a hunting effect of these elements and the indicating members connected therewith with consequent delay in reading the latter due to the necessity of waiting for them to come to rest.

The number of consecutive positions which may be transmitted by the system depends on the number of sections of the resistance units which are separately engaged by the contact devices, but if a greater degree of fineness of transmitted positions is required a plurality of sets of transmitter and receiver units may be employed, these units being arranged for coarse and fine readings with suitable arrangements for shifting the control from the fine reading units to the coarse reading units for the purpose of synchronizing them when such an operation is necessary.

Figure 2:
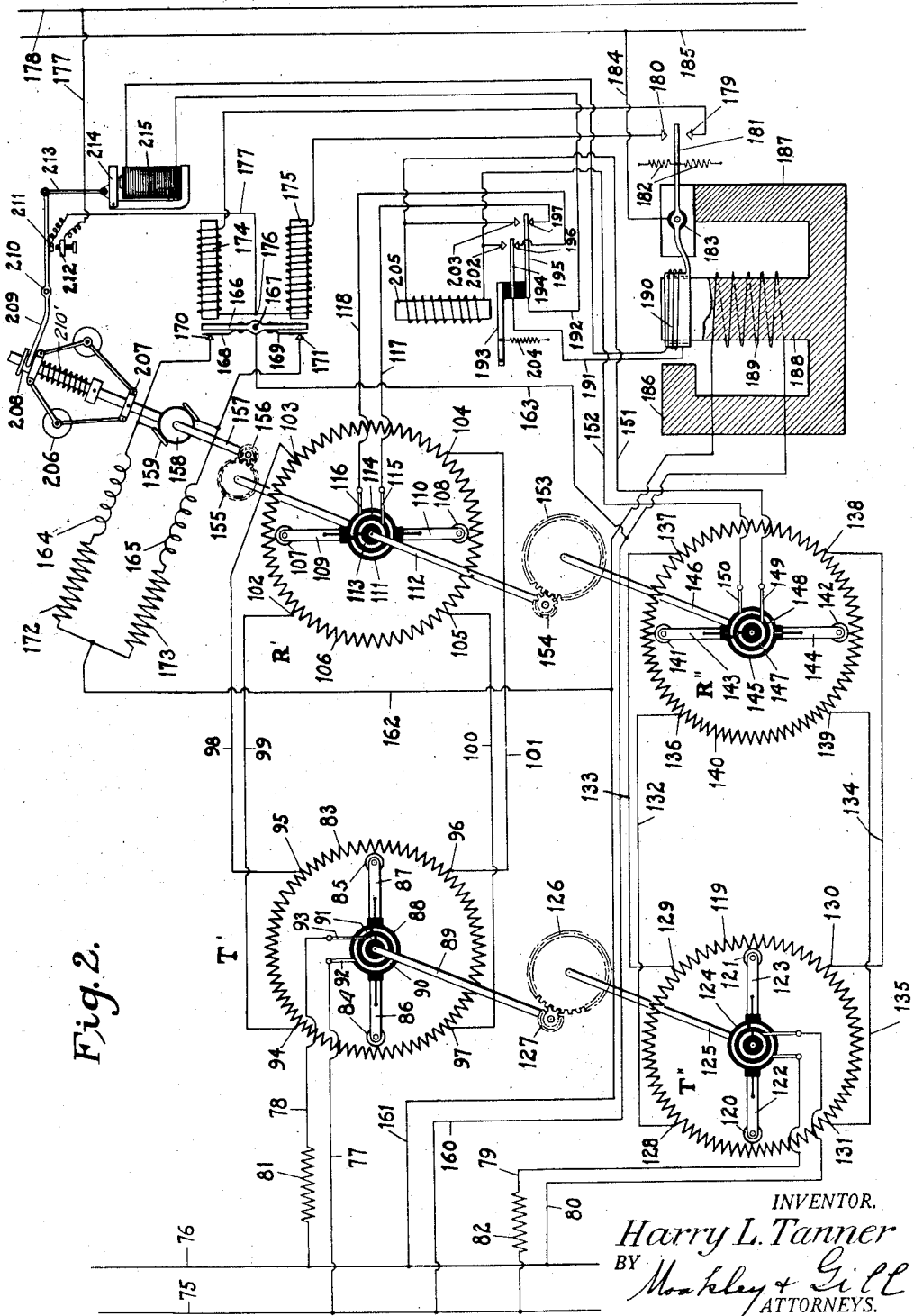

The particular nature of the invention will appear more clearly from a description of certain preferred embodiments thereof as shown in the accompanying drawings in which Fig. 1 represents somewhat diagrammatically a system composed of a single transmitter and a single receiver in connection with one arrangement for damping oscillations of the moving elements of the receiver, Fig. 2 represents a system having coarse and fine transmitting and receiving units with another arrangement for damping the oscillations of the moving parts of the receiver, and Fig. 3 represents a modified form of resistance controlling means.

Referring particularly to Fig. 1, the transmitting unit, indicated generally by T, consists of a closed resistance unit 1 herein shown as of circular form with its turns indicated somewhat diagrammatically, it being understood that this unit may be of any suitable construction for its intended purpose. Co-acting with the resistance unit are contact devices 2 and 3 herein shown in the form of rollers at the ends of arms 4 and 5 connected to a spindle or shaft adapted to be rotated from the mechanism or instrument, the indications of which are to be transmitted, but which since it forms no part of the present invention has been omitted from the diagram for the sake of clearness.

For the purpose of supplying current to the unit from the mains 6 and 7 there is provided a pair of slip rings 8 and 9, the former being engaged by a brush 10 and electrically connected to the arm 4 and the latter being engaged by a brush 11 and electrically connected to the arm 5. A variable resistance 12 of any suitable type may be placed in one of the mains for adjusting the current supply to the system.

At symmetrically arranged points 13, 14, 15 and 16 conductors 17, 18, 19 and 20 are respectively connected to the resistance coil 1 of the transmitter. These conductors are connected at points 21, 22, 23 and 24 respectively with the resistance unit 25 of the receiver designated generally by R. Like the transmitter, the receiver is provided with rollers 26 and 27 co-acting with the resistance unit and carried on the ends of arms 28 and 29 which are mounted on a shaft adapted to be rotated by a servo motor as will hereinafter appear. The arms 28 and 29 are electrically connected respectively to slip rings 30 and 31 which are engaged by brushes 32 and 33 respectively and from which lead conductors 34 and 35. The coil 36 of a solenoid is connected between the conductors 34 and 35. The plunger 37 of the solenoid carries an insulated contact roller 38 and is retracted by a spring 39, such retraction being controlled by a dash-pot device 39'. The roller is electrically connected to conductor 34 by a conductor 40 and co-acts with a resistance 41 connected by a conductor 42 to the movable coil 43 of a relay 44, the other terminal of the coil being connected to conductor 35. The relay 44 is provided with a central pole piece 45 and a surrounding annular pole piece 46. The pole pieces are energized by the coil 47 placed upon the central pole piece and receiving its current supply by conductors 48 and 49 connected to the main supply leads 6 and 7 respectively. The coil 43 of the relay is mounted on one end of a lever 50 pivotally mounted as at 51 in a slot in the annular pole piece 46. The lever is held in normal position by centralizing springs 52 and its free end is adapted to engage one or the other of two contacts 53 or 54 of the electro magnets 55 and 56 respectively of a more powerful relay 57 adapted to be supplied with current from a suitable source by conductor 58 connected to lever 50 and conductor 59 common to the electro magnets 55 and 56. The source of current may be the same as that used for the transmitter and receiver or one of different voltage. The armature 60 of the relay which is centralized by non-magnetic springs 60' co-acts with one or the other of two contacts 61 or 62 for establishing circuit from conductor 58 through conductor 63 to field coils 64 or 65 respectively of a servo motor 66, the armature 67 of which is connected in series with the field coils and through shaft 68, gears 69 and shaft 70 is adapted to drive the contact devices and slip rings of the resistance unit 25 of the receiver when the servo motor is in operation. Included in series with the armature and fields of the servo motor is the electro magnet 71 of a brake 72 adapted to be held against a drum 73 on the shaft 68 by a spring 74 when the electro magnet is de-energized.

In the operation of the system described above, assuming that current of suitable voltage is supplied to the contact devices 2 and 3 of the transmitter T, which for purposes of explanation will be regarded as lying midway between points 13 and 16 and 14 and 15, respectively, the points 13 and 16 will be of equal potential as will also the points 14 and 15, and there will be an equal difference of potential between the points 13 and 14 on the one hand and 16 and 15 on the other hand. The voltage conditions existing at the points 13, 14, 15 and 16 of the transmitter will be reproduced at the points 21, 22, 23 and 24 of the receiver except for the drop in potential due to the resistance of the conductors 17, 18, 19 and 20. There will, therefore, be substantially the same difference of potential between the points 21 and 22 and between the points 23 and 24 as exists between the corresponding points of the transmitter. Since the resistance between the points 21 and 22 on the one hand is equal to that between points 23 and 24 on the other hand there will be an equal drop in potential between each of these pairs of points so that when the contact devices 26 and 27 occupy positions midway between the points or at right angles to the positions occupied by the contact devices 2 and 3 of the transmitter there will be no potential difference between the contact devices of the receiver. At other points there will be a difference of potential between them depending upon their positions with respect to the points 21, 22, 23 and 24. This difference of potential will be accompanied by a corresponding flow of current from the transmitter unit through conductors 17, 18, 19 and 20, the resistance unit 25, contact devices 26 and 27, arms 28 and 29, slip rings 30 and 31, brushes 32 and 33, conductors 34 and 35 and the coil 43 of the relay 44. As the pole pieces of the relay are polarized the coil will move in one direction or the other according to the direction of its own field to establish a circuit through one or the other of the electro magnets 55 or 56 of relay 57. This will result in energizing one or the other of the fields 64 or 65 of the servo motor according to the position of the armature 60 of the relay. The armature of the motor will through shafts 68 and 70 and gears 69 drive the contact devices of the receiver until they reach such a position that the coil 43 of the first relay is no longer energized. This condition will exist when the contact devices of the receiver occupy the position shown in the diagram, which as explained above, is at 90° to the position occupied by the devices of the transmitter.

The system will operate in the manner described above wherever the contact devices 2 and 3 of the transmitter may be located or while they are being moved from one position to another, the corresponding devices of the receiver taking up a normal or neutral position at right angles to the position of the contact devices of the transmitter. The movable parts of the receiver will however be subject to some oscillation before they reach their normal position due to their inertia and that of the driving motor. The greater the displacement of the contact devices of the receiver from their normal position the greater will be the time required for them to reach this position and there will be time for the servo motor to acquire a greater speed than if the contact devices were comparatively close to their normal position. There will therefore be a greater tendency for them to overrun this position with consequent objectionable oscillations. It is therefore desirable to provide an arrangement for damping the oscillations in order that the system may function most effectively.

The lever 50 which carries the coil 43 of the sensitive relay 44 is centralized by the springs 52 which become effective when the current in the coil has decreased to such a value that it is no longer sufficient to overcome the effect of the centralizing springs. The value of the current in the coil depends upon the potential difference between the contact devices 26 and 27 of the receiver, which in turn depends upon their displacement from the normal or zero position. If this potential difference be insufficient to cause the requisite current to flow through the coil when the contact devices approach the zero position the inertia of the servo motor and other moving parts of the receiver may cause the contact devices to run somewhat beyond their zero position whereupon the potential difference between them will cause a reverse current through the coil 43 of the sensitive relay 44 with consequent energization of the servo motor in the reverse direction. These operations may occur several times before the contact devices reach their zero point, and it is the purpose of the damping arrangement to prevent such oscillations.

Whenever there is a potential difference between the contact devices 26 and 27 of the receiver with consequent flow of current through conductors 34 and 35 there will be a flow of current through the coil 36 of the solenoid which is bridged between these conductors. This will cause the attraction of the plunger 37 to alter the position of contact roller 38 to introduce more resistance into the circuit of the coil 43 of the sensitive relay. This reduction of current in the coil will permit the centralizing springs 52 to open the circuit of the controlling relay 57 and thereby de-energize the servo motor when the contact devices 26 and 27 have a greater displacement from their zero position than if additional resistance were not inserted in the circuit of the coil of the sensitive relay. This will give more time for the servo motor and moving parts driven thereby to come to rest and by proper proportioning of the elements of the system the contact devices of the receiver will stop at their zero position with little or no tendency to oscillate about this position. The amount of resistance inserted by the solenoid depends upon the movement of its plunger which in turn depends upon the strength of the current in its coil. As the strength of the current depends upon the potential difference between the contact devices 26 and 27 which in turn depends upon their displacement from the zero position, there is thus provided a damping arrangement the effect of which varies in accordance with such displacement of the contact devices. Since the speed of these devices as determined by the speed of the servo motor varies according to their displacement from the zero position the damping arrangement exerts a greater effect when the contact devices are moving at higher speeds than when they are moving slowly, with the result that under all conditions they are brought to rest at the zero position irrespective of the speed at which they may be moving as they approach this position.

In order to provide for quickly checking the speed of the rotating parts of the system when the circuit of the servo motor is opened, brake 72 is provided. As soon as the motor circuit is opened electromagnet 71 is de-energized and the spring 74 draws the brake against the drum 73 to check rotation of the moving elements of the system. This braking device in conjunction with the damping arrangement described above provides an effective mechanism for damping the oscillations of the receiver and the indicating devices associated therewith, so that a signal transmission system is provided in which successive indications of a variable quantity may be reproduced accurately and rapidly at a distant station. Variations in contact resistance between the resistance units and the contact devices do not affect the accuracy of readings for they merely change the potential differences of the system without altering the normal or zero relation of the contact devices of the receiver to those of the transmitter.

As shown in the drawing each contact device is in engagement with one turn of the corresponding resistance unit, in which case the number of available positions of the contact devices corresponds to the number of turns of the resistance unit. This arrangement gives the most definite series of positions of the receiver, but by modifying the apparatus so that one contact device may alternately engage two turns of its resistance unit while the other device engages one turn of the unit alternately, twice the number of positions may be obtained at the receiver.

In the simple embodiment of the invention described above four points of connection between the resistance units of the transmitter and receiver have been shown, but the invention is not confined to this number as any other number of connections may be used, it being only necessary for accurate readings at all points that the contact devices of the receiver shall not lie in the corresponding section of the resistance unit of the receiver, when in zero position, as do the contact devices of the transmitter. It will be understood however, that even a system in which this condition may occur will be operative but it may not possess the required degree of accuracy at all points.

If the number of positions to be transmitted is equal to the number of positions obtainable by one rotation of the contact devices of the transmitter, the receiver will automatically synchronize itself. If the contact devices of the receiver are 180° from their correct position, which represents their greatest possible out of synchronism condition, they will be in an unstable condition, and any movement of the contact devices of the transmitter will be followed by a restoration of the contact devices of the receiver to their normal position.

If the number of positions to be transmitted requires more than one rotation of the contact devices of the transmitter, the contact devices of the receiver may be out of synchronism as far as the number of rotations is concerned, but if they are brought within a half rotation of their correct position with respect to the contact devices of the transmission, they will then automatically set themselves in the correct position.

Referring to Fig. 2, provision is made for fine transmitting and receiving units T' and R' respectively and coarse transmitting and receiving units T'' and R'' respectively, current being supplied to the fine and coarse transmitting units of the transmitter T from mains 75 and 76 by leads 77, 78, 79 and 80 respectively. In this system use is made of fixed resistances 81 and 82 in the leads 78 and 79 instead of variable resistances such as resistance 12 in Fig. 1.

The transmitting unit T' consists of a closed resistance unit or coil 83 with which coact contact devices 84 and 85 in the form of rollers at the ends of arms 86 and 87 carried by a hub 88 on a shaft 89 to be rotated from the instrument or mechanism, the indications of which are to be transmitted. The hub 88 also carries slip rings 90 and 91 connected with arms 86 and 87 respectively and engaged by brushes 92 and 93 connected with leads 77 and 78 respectively. It should be understood that the arms 86 and 87 and slip rings 90 and 91 are insulated from the shaft 89.

At symmetrically arranged points 94, 95, 96 and 97 the resistance coil 83 is connected by respective conductors 98, 99, 100 and 101 with correspondingly arranged points 102, 103, 104 and 105 on a closed resistance coil 106 of the receiving unit R' which, like the transmitting unit T' is provided with contact rollers 107 and 108 on arms 109 and 110 mounted on a hub 111 fixed on a shaft 112. Also mounted on hub 111 are slip rings 113 and 114 connected respectively with arms 109 and 110 and engaged by brushes 115 and 116 connected with conductors 117 and 118 respectively. Here also arms 109 and 110 and slip rings 113 and 114 are insulated from shaft 112.

For purposes of explanation the contact devices of the transmitting unit T' and of the receiving unit R' are shown in positions corresponding to those of the corresponding contacts on Fig. 1, that is, contact 84 is midway between points 94 and 97, contact 85 is midway between points 95 and 96, contact 107 is midway between points 102 and 103, and contact 108 is midway between points 104 and 105. There will then be an equal difference of potential between the points 94 and 95 on the one hand and 97 and 96 on the other hand. The voltage conditions at the points 94, 95, 96 and 97 will be reproduced at the points 102, 103, 104 and 105 of the receiving unit R' except for the drop in potential due to the resistance of conductors 98, 99, 100 and 101. There will then be substantially the same difference of potential between the points 102 and 103 and between the points 105 and 104 as exists between the corresponding points of the transmitting unit T'. Inasmuch as the resistance between the points 102 and 103 is equal to that between points 104 and 105, there will be an equal drop in potential between the points of each of these pairs and when the contact devices 107 and 108 occupy positions midway between the points or at right angles to the positions occupied by the contact devices 84 and 85 there will be no potential difference between the contact devices of the receiving unit R'. When, however, the contact devices 107 and 108 are not at 90° from the positions of the contact devices 84 and 85 there will be a difference of potential between them depending upon the relative angular positions of the two sets of contacts. Such difference of potential will cause a corresponding flow of current from the transmitting unit T' through the contact devices 107 and 108, slip rings 113 and 114, brushes 115 and 116 to conductors 117 and 118 to assist in controlling the operation of a servo motor to turn the shaft 112 and bring the receiving unit R' into agreement or synchronism with the transmitting unit T'.

The coarse transmitting unit T'' comprises a closed resistance coil 119, contacts 120 and 121, arms 122 and 123, and a hub 124 mounted on a shaft 125 having thereon a gear 126 meshing with a smaller gear 127 so that an angular movement of shaft 89 will be accompanied by a smaller angular movement of the shaft 125, such connections being made for reasons to be brought out hereinafter.

At symmetrically arranged points 128, 129, 130 and 131 the closed resistance coil 119 is connected by means of conductors 132, 133, 134 and 135 with symmetrically arranged points 136, 137, 138 and 139 of a closed resistance coil 140 of the coarse receiving unit R'', which also comprises contact rollers 141 and 142 mounted on arms 143 and 144 projecting from a hub 145 on a shaft 146 and connected respectively with slip rings 147 and 148. Engaging the slip rings 147 and 148 are brushes 149 and 150 connected respectively with conductors 151 and 152. When the contact devices 141 and 142 are not at 90° from the positions of the contact devices 120 and 121 there will be a flow of current from the transmitting unit T″ to the receiving unit R″ and through the conductors 151 and 152 to assist in controlling the operation of the servo motor to turn the shaft 146 to bring the receiving unit R″ into agreement or synchronism with the transmitting unit T″.

Fixed on the shaft 146 is a gear 153 meshing with a smaller gear 154 on the shaft 112 thereby connecting the shafts 146 and 112 in the same manner as shafts 125 and 89 of the transmitting units T″ and T′ are connected. Fixed on the shaft 112 is another gear 155 meshing with gear 156 on a shaft 157 carrying the armature 158 of a servo motor 159.

For operating the servo motor 159 current is supplied through leads 160 and 161 extending from the mains 75 and 76 respectively and connected by conductors 162 and 163 respectively with the field coils 164 and 165 of the servo motor and with an armature 166 mounted centrally on a pivot 167 and normally centralized by springs 168 and 169 engaging contacts 170 and 171 also connected with the field coils 164 and 165 but at the ends opposite the conductor 162. It will be seen that normally the circuit is closed through both of the field coils 164 and 165 but that as the armature 158 is in a bridge between the field coil circuits that no current ordinarily flows through the armature. In order to obtain proper control of the servo motor provision is made of resistances 172 and 173 in series with the field coils 164 and 165 respectively.

By swinging the armature 166 from its central position it may be disconnected from one of the contacts 170 and 171 thus causing a difference of potential between the two field coil circuits thereby causing operation of the servo motor to turn the shafts 112 and 146 until the receiving units are in agreement or synchronism with the transmitting units.

To control such movements of the armature 158 use may be made of two electro magnets 174 and 175 of which the coils are connected at one end at a point 176 by a conductor 177 to a main 178 and at the other end to two spaced contacts 179 and 180 respectively. Between the contacts 179 and 180 is one end of a lever 181 normally held midway therebetween by centralizing springs 182. This lever is pivoted at 183 and connected by a conductor 184 with a main 185 associated with the main 178. It will be evident that when the lever 181 is swung in one direction the circuit of the electromagnet 174 will be closed and when the lever 181 is swung in the other direction the circuit of the electromagnet 175 will be closed. The lever 181 is mounted in an annular pole piece 186 of a relay 187 having a central pole piece 188 around which is arranged a coil 189 connected at its opposite ends with the leads 160 and 161. Mounted on the end of the lever 181 opposite the contacts 179 and 180 is a movable coil 190 forming part of the relay 187.

The conductor forming the coil 190 is connected by branches 191 and 192 with a pivoted switch 193 on which are mounted but insulated therefrom, contact arms 194 and 195 connected with the branches 191 and 192 and normally engaging contacts 196 and 197 respectively so that in case the switch 193 is moved outwardly against the action of a spring 204 the arms 194 and 195 will be brought into engagement with the contacts 202 and 203 respectively and the servo motor 159 will be put under control of the coarse transmitting unit T″ and receiving unit R″. Such shifting of the switch 193 may be effected by means of an electromagnet 205 having a coil connected with the conductors 151 and 152 so that when sufficient current passes through the circuit formed by these conductors the electromagnet will swing the switch upwardly to place the servo motor under control of the coarse transmitter and receiver.

Mounted on the shaft 157 of the servo motor is a centrifugal governor 206 having at its lower end a ring 207 fixed on the shaft and at its opposite end a sliding ring 208 having a groove into which project the arms of a fork on a lever 209 pivoted at 210 and normally positioned by means of a spring 210′ with a contact piece 211 in engagement with an adjustable contact in the form of a screw 212, thus closing the circuit through the two parts of the conductor 177. When the motor shaft 157 begins to revolve at sufficient speed the right hand end of the lever 209 will be urged upwardly to withdraw the contact piece 211 from the screw 212 to break the circuit through the coil 174 or 175, according to which is energized, and permit the lever 181 to move to central position under the influence of the springs 182. The circuit opening movement of the lever 209 is resisted by means of a link 213 connected with an armature 214 controlled by an electromagnet 215 whose coil is connected in series with the coil 190 of the relay 187.

As compared with the form shown in Figure 1 the braking of the electric motor is effected as a result of the arrangement of the field coils 164 and 165 the resistances 172 and 173 and the means by which the current is supplied to the motor. In the same manner the electromagnet 215 together with the governor 206 regulate the energization of the electromagnets 174 and 175 and effect a damping action corresponding to that effected by the device including resistance 41 in the arrangement shown in Fig. 1.

The operation of the system shown in Fig. 2 is substantially as follows:

If the instrument from which signals are to be transmitted is turned, the arms of the contact device in the coarse transmitting unit T″ will be turned much more slowly than the corresponding parts of the transmitter T′ and when the contact devices on the shafts 89 and 112 are out of synchronism to a considerable extent the contact devices on the shafts 125 and 146 will be out of position sufficiently to cause a current to flow through the conductors 151 and 152 to energize the electromagnet 205 and close the circuit of the movable coil 190 of the relay 187 through the contacts 202 and 203. The lever 181 will then be swung into engagement with one or the other of the contacts 179 and 180 to cause the energizing of one of the electromagnets 174 or 175. The servo motor 159 will then be thrown into operation to bring the contact devices on the shafts 112 and 146 into synchronism with the contact devices on the shafts 89 and 125. When the contact devices 141, 142 and 120, 121 have been brought fairly closely into agreement the current through the conductors 152 and 151 will drop so as to de-energize the magnet 205 and the arms 194 and 195 will again be brought into engagement with the contacts 196 and 197 thus throwing the servo motor under the control of the fine transmitting unit T′ and receiving unit R′ of which the contacts may still be considerably out of position.

When the servo motor is under the control of the coarse transmitting unit T″ and coarse receiving unit R″ the motor will gradually pick up speed and tend to carry the shafts 112 and 146 past the desired positions. As soon, however, as the motor begins to turn, the centrifugal governor 206 becomes effective to pull down the left end of the lever 209 and to withdraw the contact piece 211 from the contact 212. When, therefore, the current through the coil 190 and the electromagnet 215 falls off due to the approach to synchronism of the coarse receiver with the coarse transmitter, the governor 206 will overcome the electromagnet and break the circuit through the conductor 177. The energized magnet of the pair 174 and 175 will then be de-energized and the armature 166 will be permitted to return to its normal position. Due to the special scheme of field and armature connections used the servo motor will act as a brake whenever the relay is in centralized position. The magnet 205 will also be de-energized at this time and the switch 193 swung to its Fig. 2 position by means of spring 204.

When the control of the servo motor is thus restored to the fine transmitter and receiver, the contacts 107 and 108 may still be considerably out of position with reference to the contacts 84 and 85 and there will be a sufficient difference of potential between the brushes 115 and 116 to cause a flow of current through the coil 190 in one direction or the other to swing the lever 181 into engagement with one of the contacts 179 or 180. One of the magnets 174 and 175 will then be energized and the motor 159 turned in the proper direction to bring the contacts 107 and 108 into positions corresponding to the positions of contacts 84 and 85 and thus restore the proper condition of no potential difference between the contacts 107 and 108. Damping will be effected as described in connection with the bringing of the coarse receiver into synchronism with the coarse transmitter.

Instead of the damping means shown in Fig. 2, there may be provided, as shown in Fig. 3, a resistance coil 216 in the conductor 192 and having attached thereto at regular intervals spring contacts 217, 218, 219 and 220. Normally these contacts are in engagement with a disk 221 on a sleeve 222 mounted on the shaft 157 and connected with the slidable ring 208 of the centrifugal governor 206. The disk 221 is normally held in engagement with the spring contacts by a spring 223 interposed between the fixed ring 207 and the slidable ring 208. When, however, the shaft 157 begins to rotate with sufficient speed the centrifugal governor 206 will act to draw the sleeve 222 downwardly to separate the disk 221 from the spring contacts. The contacts follow the disk until engaged by corresponding stop screws 224, 225, 226 and 227 so mounted in a support 228 such as a fixed ring, as to separate the spring contacts from the disk one at a time and, instead of having the circuit closed through the spring contacts 211 and 212, to throw into the circuit one section after another of the resistance coil 216 to decrease the current through the coil 190 and thereby cause the relay 187 to be thrown out of operation.

Inasmuch as the relay is a polarized relay it is evident that a difference of potential in one direction or the other will tend to cause the current to flow through the armature of the motor in a direction in accordance with the difference of potential at the slip rings of the receivers in use.

I claim:—

1. In a direct current transmission system, a transmitter, a receiver connected with the transmitter for substantially continuous control thereby, a motor to turn the receiver, means including a polarized relay having a movable coil and for controlling the motor from the receiver, and damping means for the receiver including a device in series with with the movable coil of the polarized relay and a centrifugal governor adapted to be actuated by the motor to control said device.

2. In a transmission system, a transmitter, a receiver connected with the transmitter for control thereby, a motor to turn the receiver into synchronism with the transmitter, means including a relay controlled by the receiver for causing the motor to turn in one direction or the other as required, a switch in the relay circuit, means including a centrifugal governor actuable by said motor to open said switch, and means including an electromagnet controlled by the receiver for resisting the opening of said switch.

3. In a transmission system, a transmitter, a receiver connected with the transmitter for control thereby, a motor to turn the receiver into synchronism with the transmitter, electromagnetic means including a direction switch to determine the direction of actuation of the motor, a circuit-breaking switch to render said electromagnetic means ineffective, means controlled by said receiver to determine the actuation of said direction switch, a centrifugal governor operable by said motor to open said circuit-breaking switch, and an electromagnet energized by said receiver to resist the action of said governor.

4. In a transmission system, a transmitter, a receiver connected with the transmitter for control thereby, a motor to turn the receiver into synchronism with the transmitter, means including a relay controlled by the receiver for causing the motor to turn in one direction or the other as required, and a damping means for the motor including a centrifugal governor to control the operation of said relay.

5. In a transmission system, a transmitter, a receiver connected with the transmitter for control thereby, a motor to turn the receiver, a relay controlled by the receiver to control the motor, and a governing device connected to the motor to control the relay independently of the receiver.

6. In a transmission system, a transmitter, a receiver connected with the transmitter for control thereby, a motor to turn the receiver, damping means to act on the motor as the receiver approaches its desired position, and a governing device actuating the damping means upon an overspeeding of the motor.

In testimony whereof I affix my signature.

HARRY L. TANNER.